United States Patent [19]
Ponticelli et al.

[11] Patent Number: 5,107,213
[45] Date of Patent: Apr. 21, 1992

[54] METHOD AND APPARATUS FOR SIGNAL EVALUATION OF ZERO-AXIS CROSSINGS

[75] Inventors: Martin Ponticelli; Gerald Lackner, both of Graz, Austria

[73] Assignee: AVL Gesellschaft fuer Verbrennungskraft-maschinen und Messtechnik mbh, Prof.Dr.Dr.h.c. Hans List, Austria

[21] Appl. No.: 653,761

[22] Filed: Feb. 11, 1991

[30] Foreign Application Priority Data

Feb. 9, 1990 [AT] Austria .................................. 302/90

[51] Int. Cl.⁵ .......................................... G01M 15/00
[52] U.S. Cl. .............................................. 324/207.25
[58] Field of Search .......................... 73/116; 307/515; 324/207.25; 123/614

[56] References Cited

U.S. PATENT DOCUMENTS 4,301,778 11/1981 Latapie .......................... 123/614 X
4,687,952 8/1987 Capazzi, Jr. ...................... 307/515 X Primary Examiner—Jerry W. Myracle
Attorney, Agent, or Firm—Hill, Van Santen, Steadman & Simpson

[57] ABSTRACT

For evaluating the essentially-periodic signal sequence of inductive measured-value sensors in view of the appearance of zero-axis crossings, all zero-axis crossings in the sensor signal are identified in a zero-axis crossing branch of an evaluation unit and the significant zero-axis crossings are enabled in a parallel enable branch after logarithmic transformation of the sensor signal.

12 Claims, 2 Drawing Sheets

METHOD AND APPARATUS FOR SIGNAL EVALUATION OF ZERO-AXIS CROSSINGS

BACKGROUND OF THE INVENTION

1. Field of the Invention

The present invention relates to a method and to an apparatus for evaluating the measured signals of a sensor, particularly for evaluating the signals of an inductive, measured-value sensor for marking the rotational position at an internal-combustion engine, whereby the sensor signal is supplied to an evaluation unit with which or in which, in particular, the appearances of zero axis crossings are identified.

2. Description of the Prior Art

Such methods and apparatus are known, in general, and, for example, enable the acquisition and processing of the signals of inductive, measured-value sensors as are utilized, for example, in internal-combustion engines in a great variety of arrangements as apparatus for marking rotational position. The magnetic flux generated by a power supply or by a permanent magnet that passes through an emitter coil is influenced, dependent on ferromagnetic material in the close proximity thereof, such that corresponding marks on a rotating disk that, for example, is secured to the crank shaft or the cam shaft, or acquired as flux maximum at pins or, respectively, as flux minimum at slots. This respectively corresponds to a zero-axis crossing of the induced emitter voltage with different tendency.

Standard embodiments, for example, are arrangement for marking the top dead center (TDC) with one or more pins or slots distributed over the circumference of the disk flywheel and with different angular positions relative to the physical TDC as well as, furthermore, arrangements for identifying, or, respectively, evaluating the angular velocity, whereby measurement is carried out at a gear rim, for example, at the starter gear rim of the disk flywheel and a TDC marking in the form of a defined gap may be additionally provided. A distinction must therefore be made between two instances. On the one hand, there are arrangements having a known polarity (pin or slot having emitters protected against pole reversal) or, respectively, having insignificant polarity (gear rim); by contrast thereto, arrangements of unknown, but significant polarity, are also to be covered, whereby an automatic pin/slot recognition is then desirable.

Depending on a number of parameters, such as emitter sensitivity, emitter spacing, geometrical execution of the marks, circumferential speed of the emitter disk, a very large range of voltages to be acquired usually results, typically, a usable range of the emitter voltage from 20 m$V_{pp}$–100 $V_{pp}$ is required. In order to be able to process such a range of dynamics with the required accuracy in the acquisition of the zero-axis crossings, a gain control of the signal in the form of an AGC (automatic gain control) circuit or in digital form was heretofore employed in the known methods or, respectively, apparatus of the type generally set forth. This method, however, contains the disadvantages of a response phase as well as of a great expense in the control when high dependability is to be achieved over a great range of speeds given, at the same time, a great speed dynamic. Such conditions occur, for example, when transient motor conditions are to be acquired as represented, for example, by a dynamic power measurement (free, high acceleration vis-a-vis the inherent torque) or by the checking of the idling control (undershooting or, respectively, overshooting given abrupt load change). When relatively low speeds are then also to be simultaneously measured (for example, the starter speed given a compression measurement), then circuit designs realized with usually justifiable expense are usually overburdened.

In order to eliminate the speed dependency of the size of the useful signal, the German published application 32 34 383, for example, discloses a method and an operating device therefore, whereby markings of a rotating disk are evaluated with an inductive emitter such that the emitter signal is integrated and then supplied to a threshold switch. Although the disadvantage of the speed dependency of the size of the useful signal is therefore eliminated, the other influencing variables in this respect, such as emitter sensitivity, emitter spacing and geometrical execution of the marks are not. In addition, integrating systems having traditional emitter disks are sensitive to low-frequency disturbances having an inherently low level such as can occur, for example, as a consequence of a bearing play at starter speeds when the gyro-stabilizing forces are still too low.

Also, for example, the European patent documents EP 83 594 and EP 28 27 32 disclose methods and apparatus for generating speed-dependent signal sequences from the signals of inductive emitters whose shared feature, however, is that it is not the signal zero-axis crossing that is interpreted, but that an optimally-accurate triggering should occur at a defined signal quantity. Since, by definition of the zero-axis crossing of the reference quantity must be utilized for certain measurements at, for example, internal-combustion engines, for example for calculating the start of delivery angle at a diesel motor, a utilization of this method is not suitable for all signals of inductive emitters employed in the diagnosis of internal-combustion engines. In addition, the follow up of the trigger level by peak value measuring devices having a defined discharge time constant can only represent a compromise when broadbands of speed are to be processed given high motor dynamics since the inaccuracies thereby made directly enter into the trigger time.

SUMMARY OF THE INVENTION

It is an object of the present invention to avoid the above-mentioned disadvantages of the known methods and apparatus of the type generally set forth and, in particular, to provide an improved method and an improved apparatus for evaluating the measured signals of a sensor, particularly for evaluating the signals of an inductive measured-value sensor for marking rotational position at an internal-combustion engine, such that, with simple means, the disadvantages of a dynamic control are avoided, on the one hand, and, on the other hand, a great range of dynamics can be acquired with high accuracy in the acquisition of the zero-axis crossings largely free of disturbance and uninfluenced by the specific structural conditions.

According to the present invention, the above object is achieved, in that the zero-axis crossings in the sensor signal are identified in a zero-axis crossing branch of an evaluation unit and the significant zero-axis crossings are enabled in a parallel enable branch after logarithmic transformation of the sensor signal. The measured signal of the inductive measured-value sensor is therefore divided into two branches; the zero-axis crossings that are ultimately critical for the measuring accuracy are acquired with high precision and, in particular, without phase shift in the zero-axis crossing branch, in the parallel enable branch, the respectively significant zero-axis crossing from the multitude of zero-axis crossing that were generated, for example, by mechanical irregularities of an emitter disk or by noise is respectively enabled, whereby the amplitude of the measured signal of the sensor is interpreted relative to the most-recently valid result.

It is provided in a particularly preferred development and feature of the invention, that the sensor signal, in the enable branch, is supplied, first of all, to a comparator after the logarithmic transformation and, secondly, is investigated for maximums; that the found maximums, after the subtraction of a voltage corresponding to the desired trigger level, are supplied to the comparator as a second input quantity; and that the output signal of the comparator is employed as an enable signal for the zero-axis crossings independently identified from the sensor signal in the zero-axis crossing branch. It is provided in the corresponding design of the apparatus of the invention that the evaluation unit comprises a zero-axis crossing branch as well as an enable branch, each of which is respectively supplied with the sensor signal; that the enable branch comprises a logarithmizing amplifier whose output is in communication, first of all, with a peak value measuring device and, secondly, with an input of a comparator; that the output of the peak value measuring device is applied via a summing amplifier to a second input of a comparator; in that the output of the comparator is connected to an enable unit in an evaluation logic which, on the other hand, is in communication with the output of a zero-axis crossing detector arranged in the zero-axis crossing branch.

In accordance with a further development and feature of the invention, the sensor signal can be amplified in the zero-axis crossing branch before the identification of the zero-axis crossing, to which end a limiting amplifier is arranged in the zero-axis crossing branch preceding the zero-axis crossing detector in the apparatus constructed in accordance with the present invention. This limiting amplifier also amplifies the lowest-allowable signal to such an extent that the offset deviation of the following zero-axis crossing detector cannot represent a disturbing source of error.

In accordance with a further development and feature of the invention, either a half-wave rectifier or, on the other hand, a full-wave rectifier is arranged in the enable branch preceding the logarithmizing amplifier. The alternative comprising the half-wave rectifier is provided for signals having a known polarity or for signals of chopper disks or the like wherein the polarity is of no significance. The embodiment having the full-wave rectifier is provided for signals having an unknown polarity in conjunction with an automatic pin/slot recognition that is therefore enabled.

Given appropriate connections, the logarithmizing amplifier supplies the following transformation of the signals of the measured-value sensor:

$$U_a = \ln \frac{U_o}{|i|} + C.$$

The signal transformed in this manner is then supplied, first of all, to a comparator and, secondly, is investigated for maximums with a peak-value measuring device which, for example, can then be stored in a holding amplifier device and, after the subtraction of a voltage that corresponds to the desired trigger value, can serve as a second input quantity of the comparator. A practical trigger level lies, for example, at 50% of the untransformed signal, this allowing both a high noise level as well as leaving adequate reserves for dynamic motor behavior.

According to the relationship $$\ln(|x|/2) = \ln|x| - \ln 2,$$

the value ln 2 is subtracted from the holding voltage in this case and is supplied to the comparator as a comparison voltage. Dependent on requirements, of course, other trigger levels can become meaningful. The actual evaluation logic can then be constructed either traditionally sequentially-combinatorially or, on the other hand, can be controlled by a microprocessor. Its job is the pulse shaping dependent on the comparator signals and zero-axis crossing signals as well as the control of the peak-value measuring device and of the holding amplifier, as well as the prescription of the summing voltage and of the trigger level dependent thereon.

Given the alternative having a full-wave rectifier in the enable branch for measured signals having an unknown polarity, the evaluation logic also assumes the automatic pin/slot recognition via the chronological spacings of the pulse sequences. The situation is thereby utilized that the significant zero-axis crossing always lies between the enable comparator pulses that follow one another in closer chronological succession than two successive zero-axis crossing sensor signals.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

Figure 1:
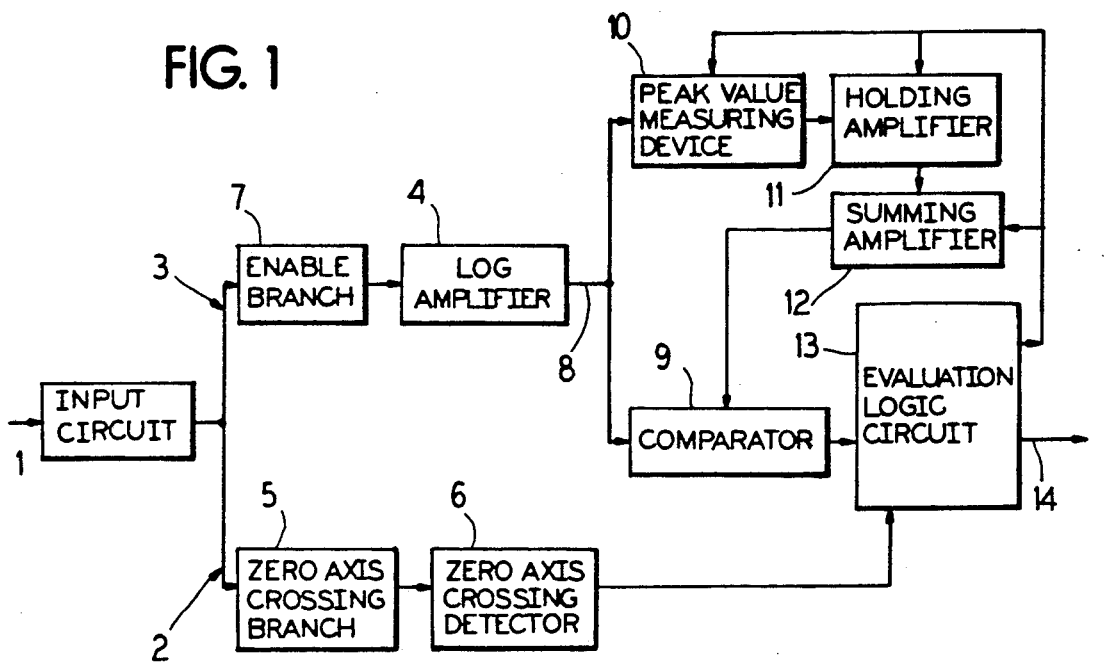
FIG. 1 is a schematic block circuit diagram of an apparatus constructed in accordance with the present invention.

Referring to the drawing, a signal is applied at a line 1 from an inductive measured-signal sensor (not shown), for example a TDC sensor at an emitter disk rotationally connected to the crank shaft of an internal-combustion engine and is divided into two branches 2, 3. The zero-axis crossing that is decisive for the measuring accuracy is acquired in the zero-axis crossing branch 2 with high accuracy and, in particular, without phase shift due to a logarithmizing amplifier 4 arranged in a parallel enable branch 3. The logarithmizing amplifier 4 is hereinafter referred to simply as the log amplifier. In the enable branch 3, the significant zero-axis crossing from the multitude of zero-axis crossings that are generated, for example, by mechanical irregularities at the emitter disk (not shown) or due to noise is enabled, whereby the amplitude of the measured value-sensor signal is evaluated relative to the most recently valid result.

The zero-axis crossing branch 2 contains a limiting amplifier 5 that also amplifies the smallest allowable signal to such an extent that the offset deviation of the following zero-axis crossing detector 6 does not form a disturbing source of error.

Preceding the logarithmizing amplifier 4 that was already addressed above, the enable branch 3 comprises a rectifier 7 that is constructed either as a half-wave rectifier for signals having a known polarity or for signals of chopper disks or is fashioned as a full-wave rectifier for signals having an unknown but significant polarity. Given appropriate connections, the logarithmizing amplifier 4 supplies the logarithmic transformation of the measured value-sensor signal that was addressed at the outset wherewith a broad range of dynamics can be covered even without the disadvantage of gain control. The signal present at the output 8 of the logarithmizing amplifier 4 is supplied, first of all, to a comparator 9 and, secondly, is investigated for maximums with a peak-value measuring device 10, the maximums than being stored in a holding amplifier stage 11 and, after subtraction of a voltage that corresponds to the desired trigger level (in a summing amplifier 12), then serving as a second input quantity for the comparator 9.

For the case of a trigger level lying at approximately 50% of the untransformed signal that was already discussed above as an example, the value ln 2 is subtracted from the holding voltage and is supplied to the comparator 9 as a comparison voltage.

An evaluation logic can either be traditionally sequentially-combinatorially constructed or can be controlled by a microprocessor. Its job is the shaping, dependent on the comparator signals and zero-axis crossing signals, the control of the peak value measuring device 10 and of the holding amplifier 11, as well as the prescription of the summing voltage and, dependent thereon, of the trigger level. The shaped, measured signal, corresponding, for example, to the actual appearance of the TDC can, be taken, finally, at the output 14 of the evaluation logic circuit 13.

Figure 2:
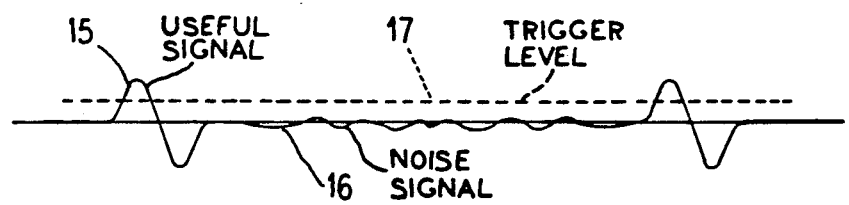
FIG. 2 is a wave form showing of an example of a signal of an inductive measured-value sensor to be processed in practice.

In the signal diagram of FIG. 2, a useful signal 15 is illustrated along with a noise signal 16 caused, for example, by noise and a trigger level 17 lying at approximately 50% of the maximum useful signal.

Figure 3:
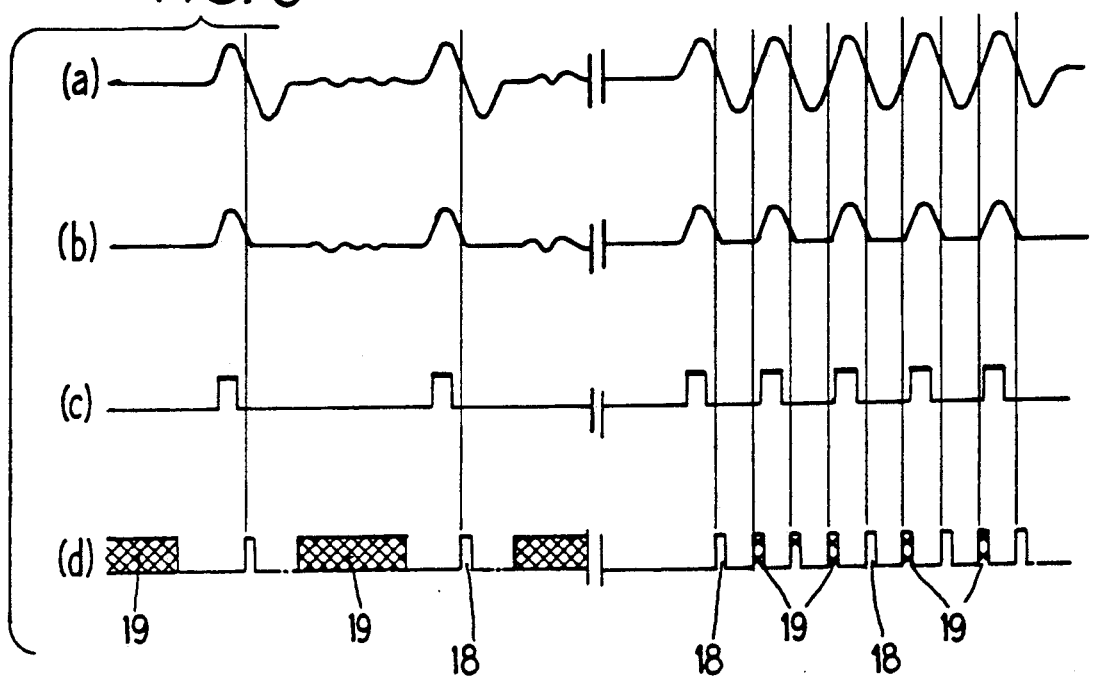
FIG. 3 is a pulse diagram illustrating the basic signal relationships for the case of half-wave rectifications.

The basic signal relationships for the case of the half-wave rectification are illustrated in FIG. 3. The curve of an input signal having a fixed polarity (left) or having insignificant polarity (for example from the flywheel gear rim, at the right) is illustrated in the top line (a). Following therebelow in the line (b) is the signal curve after half-wave rectification. In the line (c) is the output or, respectively, enable signal of the comparator (9 in FIG. 1) and, finally, in the last line, line (d), the zero-axis crossing signal obtained at the output of the zero-axis crossing detector (6 in FIG. 1). Following the evaluation logic circuit, only the significant zero-axis crossings, here referenced 18, lead to signal peaks; the insignificant zero-axis crossings lying in the regions 19 and triggered, for example, by disturbing signals or noise or, respectively, by the wrong tooth profiles are blanked.

Figure 4:
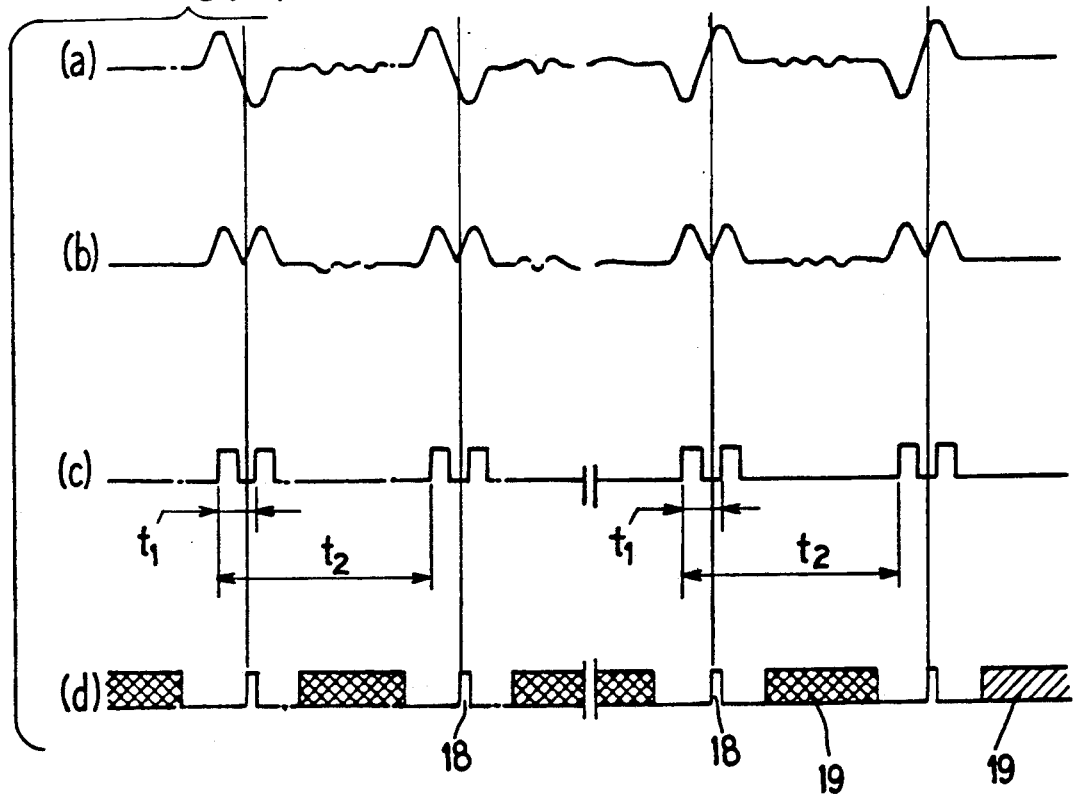
FIG. 4 is a signal diagram showing corresponding signal sequences for the case of full-wave rectification.

FIG. 4, finally, illustrates the corresponding signal relationships for the case of full-wave rectification for a signal having an unknown, but significant polarity. The input signal (for example, on line 1 of FIG. 1) is again entered in the first line, line (a), at the right for the case of a pin and at the left for the case of a slot as triggered. The signal after full-wave rectification is entered in the line (b). This is again followed in the line (c) by the enable or, respectively, comparator output signal. The signal at the output of the zero-axis crossing detector 6 of FIG. 1 is illustrated in the line (d) whereby the situation is utilized here that the significant zero-axis crossing 18 always lies between the enable comparator pulses following one another in closer chronological succession ($t_1 < t_2$). The zero-axis crossings triggered by disturbing signals or, respectively, noise that are blanked by the evaluation logic here also again lie in the regions 19.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. A method for evaluating sensor signals of an inductive measured-value sensor for marking a rotational position of an internal-combustion engine, comprising the steps of:
   (a) receiving and directing sensor signals onto first and second channels;
   (b) in the first channel, detecting and providing signals representing zero-axis crossings of the sensor signals;
   (c) in the second channel, (c1) detecting the maximums of the sensor signals, (c2) subtracting a predetermined level therefrom to produce first comparison signals, (c3) comparing the sensor signals as second comparison signals to the first comparison signals to (c4) produce enable signals; and
   (d) applying the enable signals and the zero-axis crossing signals to a logic circuit to produce signals representing significant zero-axis crossings.

2. A method for evaluating sensor signals of an inductive measured-value sensor for marking a rotational position at an internal combustion engine, comprising the steps of:
   (a) identifying the appearance of zero-axis crossings of measured-value signals;
   (b) logarithmically transforming the measured-value signals;
   (c) comparing the identified zero-axis crossings to the transformed signals to identify significant zero-axis crossings; and
   (d) producing a pulse corresponding to a significant zero-axis crossing.

3. A method for evaluating sensor signals of an inductive measure-value sensor for marking a rotational position at an internal-combustion engine, comprising the steps of:
   (a) branching sensor signals to an enable branch and to a zero-axis crossing branch;
   (b) in the zero-axis crossing branch, detecting all zero-axis crossings of the sensor signals and generating corresponding zero-crossing signals;
   (c) in the enable branch, logarithmically transforming the sensor signals and therefrom generating enable signals for the significant zero-axis crossings; and (d) applying the enable signals and the zero-axis crossing signals to a logic circuit to generate an output pulse for each significant zero-axis crossing signal.

4. The method of claim 3, wherein the step (c) is further defined as:
   (c1) detecting maximums of the logarithmically-transformed signals;
   (c2) subtracting a predetermined trigger level from the detected maximums; and
   (c3) comparing the logarithmic-transformed signals to the maximals minus the predetermined trigger level to generate the enable signals as identifying significant zero-axis crossings.

5. The method of claim 4, and further comprising the step of:
   (e) amplifying the sensor signals prior to detecting the zero-axis crossings.

6. The method of claim 5, and further comprising the step of:
   (f) rectifying the sensor signals in the enable branch prior to the step (c) of logarithmically transforming the sensor signals.

7. The method of claim 6, wherein the step (f) of rectifying is further defined as:
   (f1) half-wave rectifying the sensor signals; and the step (d) of applying the enable signals is further defined as:
   (d1) identifying the zero-axis crossing following an enable pulse as a significant zero-axis crossing.

8. The method of claim 6, wherein the step (f) of rectifying is further defined as:
   (f1) full-wave rectifying the sensor signals; and the step (c) is further defined as:
   (c1) identifying a significant zero-axis crossing from the chronological spacings of the enable signals.

9. Apparatus for evaluating the signals of an inductive measured-value sensor for marking a rotational position at an internal-combustion engine with an evaluation unit comprising:

an input for receiving the sensor signals, an output, and an enable branch and a zero-axis crossing branch connected in parallel with one between said input and said output;

said zero-axis crossing branch including a zero-axis crossing detector for detecting the zero-axis crossings of the sensor signals; and said enable branch including a logarithmic transformation amplifier for providing logarithmically-transformed signals from the sensor signals, a comparator connected to said logarithmic transformation amplifier, a peak value measuring device connected to said logarithmic transformation amplifier for detecting the maximum values of the sensor signals, a holding amplifier connected to said peak value measuring device for storing the detected maximum values, a summing amplifier connected to said holding amplifier for subtracting a predetermined trigger level from the detected maximums to produce corresponding reduce maximum levels, said summing amplifier connected to said comparator and said comparator operable in response to said transformed signals and said reduced maximum levels to produce enable signals when triggered; and an evaluation unit connected to said zero-axis crossing detector and to said comparator and operable in response to an enable signal to produce a signal indicating a significant zero-axis crossing.

10. The apparatus of claim 9, and further comprising:
a limiting amplifier in said zero-axis crossing branch connected between said input and said 0-axis crossing detector.

11. The apparatus of claim 9, and further comprising:
a half-wave rectifier connected in said enable branch between said input and said logarithmic transformation amplifier.

12. The apparatus of claim 9, and further comprising:
a full-wave rectifier connected in said enable branch between said input and said logarithmic transformation amplifier.

* * * * *